US009710675B2

(12) United States Patent
Durham et al.

(10) Patent No.: US 9,710,675 B2
(45) Date of Patent: Jul. 18, 2017

(54) PROVIDING ENHANCED REPLAY PROTECTION FOR A MEMORY

(71) Applicant: Intel Corporation, Santa Clara, CA (US)

(72) Inventors: David M. Durham, Beaverton, OR (US); Siddhartha Chhabra, Hillsboro, OR (US); Jungju Oh, San Jose, CA (US); Men Long, Beaverton, OR (US); Eugene M. Kishinevsky, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 14/669,235

(22) Filed: Mar. 26, 2015

(65) Prior Publication Data
US 2016/0283750 A1 Sep. 29, 2016

(51) Int. Cl.
G06F 21/79 (2013.01)
G06F 21/71 (2013.01)
(Continued)

(52) U.S. Cl.
CPC .......... *G06F 21/79* (2013.01); *G06F 12/1408* (2013.01); *G06F 21/71* (2013.01);
(Continued)

(58) Field of Classification Search
CPC ............ G06F 12/00; G06F 12/08; G06F 12/0802–12/0811; G06F 12/0871; G06F 12/0891; G06F 12/0897; G06F 12/14; G06F 12/1408; G06F 21/00; G06F 21/50–21/52; G06F 21/55; G06F 21/57; G06F 21/60; G06F 21/602; G06F 21/62; G06F 21/64; G06F 21/71; G06F 21/79; G06F 2212/1052; H04L 9/0891; H04L 9/3242
See application file for complete search history.

(56) References Cited

U.S. PATENT DOCUMENTS 5,724,428 A * 3/1998 Rivest .................. H04L 9/0625
380/28
6,539,092 B1 * 3/2003 Kocher ................ G06Q 20/341
380/1
(Continued)

FOREIGN PATENT DOCUMENTS

KR 10-2013-0067849 6/2013
WO WO2013/100965 7/2013

OTHER PUBLICATIONS

International Searching Authority, "Notification of Transmittal of the International Search Report and the Written Opinion of the International Searching Authority," mailed Jun. 23, 2016, in International application No. PCT/US2016/020051.

(Continued)

*Primary Examiner* — Eric W Shepperd
(74) *Attorney, Agent, or Firm* — Trop, Pruner & Hu, P.C.

(57) ABSTRACT

In an embodiment, a processor includes: at least one core to execute instructions; a cache memory coupled to the at least one core to store data; and a tracker cache memory coupled to the at least one core. The tracker cache memory includes entries to store an integrity value associated with a data block to be written to a memory coupled to the processor. Other embodiments are described and claimed.

21 Claims, 15 Drawing Sheets

(51) Int. Cl.
*H04L 9/08* (2006.01)
*G06F 12/14* (2006.01)
*H04L 9/32* (2006.01)

(52) U.S. Cl.
CPC .......... *H04L 9/0891* (2013.01); *H04L 9/3242* (2013.01); *G06F 2212/1052* (2013.01)

(56) References Cited

U.S. PATENT DOCUMENTS

| | | | |
|---|---|---|---|
| 8,588,425 | B1 | 11/2013 | Harwood et al. |
| 8,799,673 | B2 | 8/2014 | Savagaonkar et al. |
| 9,064,124 | B1* | 6/2015 | Davis .................. G06F 21/606 |
| 2001/0033656 | A1* | 10/2001 | Gligor .................. H04L 9/0637 380/28 |
| 2003/0145118 | A1 | 7/2003 | Volpano et al. |
| 2003/0200450 | A1 | 10/2003 | England et al. |
| 2004/0059967 | A1 | 3/2004 | Kleppel et al. |
| 2007/0130470 | A1 | 6/2007 | Blom et al. |
| 2007/0245147 | A1* | 10/2007 | Okeya .................. H04L 9/0643 713/181 |
| 2008/0117679 | A1* | 5/2008 | Srinivasan .............. G06F 21/79 365/185.04 |
| 2008/0232581 | A1 | 9/2008 | Elbaz et al. |
| 2009/0048976 | A1 | 2/2009 | Hars |
| 2009/0147947 | A1 | 6/2009 | Ingimundarson et al. |
| 2009/0187771 | A1 | 7/2009 | McLellan et al. |
| 2011/0154029 | A1* | 6/2011 | Hahn .................... H04L 9/0822 713/160 |
| 2011/0154059 | A1 | 6/2011 | Durham et al. |
| 2014/0208109 | A1 | 7/2014 | Trivedi et al. |
| 2014/0223197 | A1 | 8/2014 | Gueron et al. |
| 2014/0289539 | A1 | 9/2014 | Osterwalder et al. |
| 2015/0006789 | A1 | 1/2015 | Buer |
| 2015/0095661 | A1 | 4/2015 | Sell et al. |
| 2016/0140357 | A1* | 5/2016 | Newell .................... G06F 21/79 726/2 |
| 2016/0248587 | A1* | 8/2016 | Westberg ............ H04L 63/0281 |
| 2016/0248588 | A1* | 8/2016 | Langhammer ........ H04L 9/3242 |

OTHER PUBLICATIONS

U.S. Appl. No. 14/699,226, filed Mar. 26, 2015, entitled "Protecting a Memory," by Eugene Kishinevsky, et al.

United States Patent and Trademark Office, Office Action mailed Oct. 20, 2016 and Reply to Non-Final Office Action filed on Jan. 13, 2017 in U.S. Appl. No. 14/669,226.

* cited by examiner

PROVIDING ENHANCED REPLAY PROTECTION FOR A MEMORY

TECHNICAL FIELD

Embodiments relate to protection for a memory.

BACKGROUND

Memory-based attacks on computing systems are a growing concern. Due to a lack of confidentiality, integrity, and rollback protection, a wide range of attacks are possible to steal valuable data (particularly when stored in a memory) and gain control of a system. Existing solutions either provide partial protection in an effort to decrease performance overheads or provide more robust protection, but with high performance and storage overheads, which make such techniques unsuitable for widespread adoption.

DETAILED DESCRIPTION

Embodiments may be used to fundamentally protect and prevent replay attacks at any level of granularity. Stated another way, true replay protection is provided, since once a given memory location is updated with data and is protected with an integrity value associated with a current key, a replay cannot work using an old value.

Understand that while embodiments described herein provide protection for a system memory, embodiments apply equally to protecting storage of information in any memory or storage external to a protected processor package that acts as a trust boundary. As such, embodiments apply equally to storage of information in flash memories, disk drives, remote storages such as accessible via a network, and other processor-external memories and storage devices.

Figure 1:
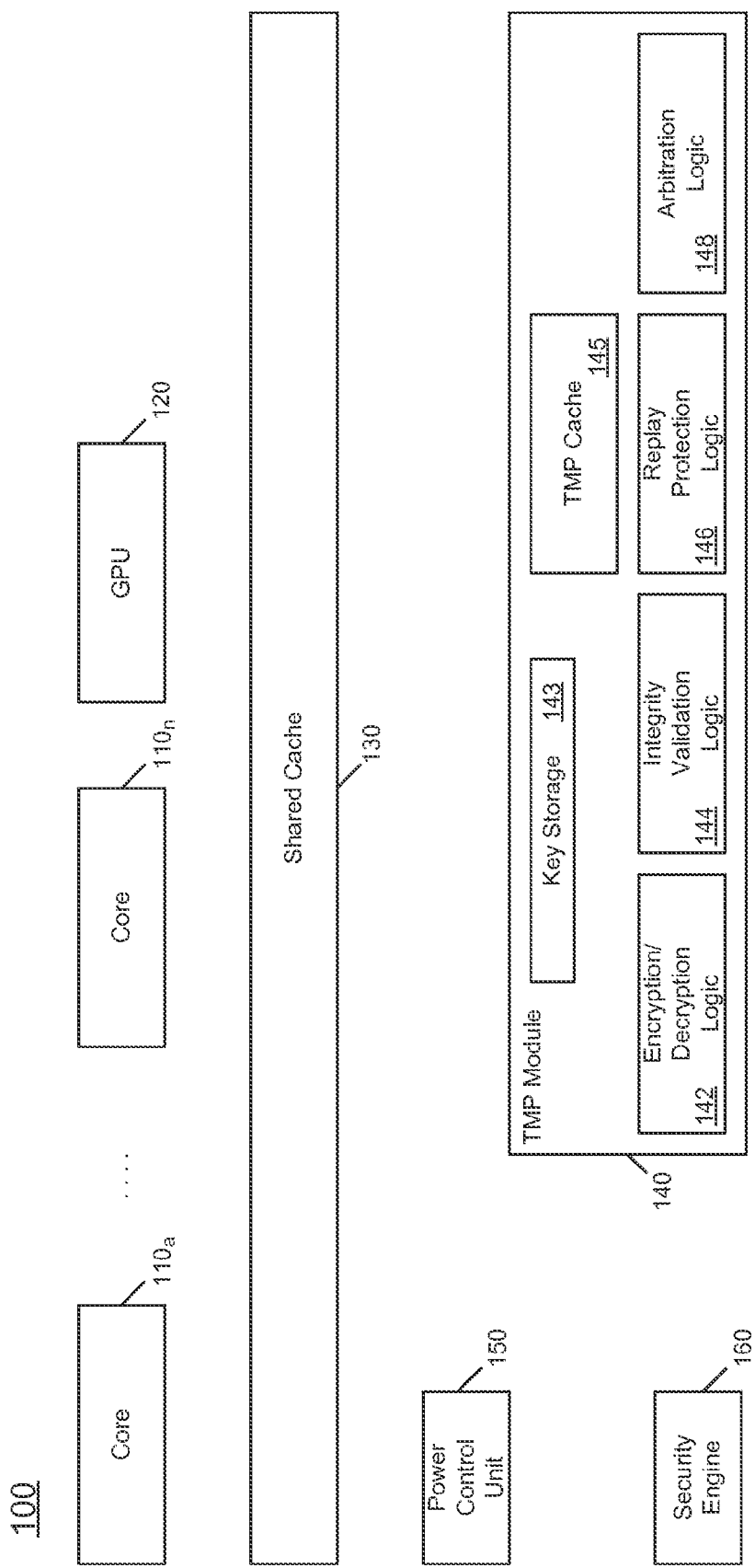
FIG. 1 is a block diagram of a processor in accordance with an embodiment.

Referring now to FIG. 1, shown is a block diagram of a processor in accordance with an embodiment. As shown in FIG. 1, processor 100 is implemented as a multicore processor and may take the form of a system-on-chip (SoC) or other multicore processor. As an example, embodiments may be used in a many-core processor suitable for incorporation in a variety of computing systems, ranging from portable devices such as smartphones, tablet computers and so forth to client computer systems and server computer systems.

As illustrated, processor 100 includes a plurality of cores 110a-110n. In different embodiments, cores 110 may be a set of homogeneous cores or a mix of heterogeneous cores. In some cases, cores 110 may be implemented as in-order, out-of-order or combinations of such cores. In addition, a graphics processing unit (GPU) 120 is present. In some cases, a single graphics processor is provided to perform specialized graphics processing using a different pipeline architecture than for cores 110. Of course understand that in some cases, multiple GPUs may be provided while in other cases, a processor may not include a dedicated GPU.

A shared cache 130 couples to the various processing cores. In an embodiment, shared cache 130 may be a last level cache (LLC) that is shared between the various cores and graphics processor. Understand further that additional levels of a cache hierarchy may be present within the cores themselves, such as private level one and level two caches internal to the cores or graphics processor. Of course other cache architectures may exist in other embodiments.

For purposes of performing total memory protection as described herein, a total memory protection (TMP) module 140 is present. Understand that TMP module 140 may be implemented as appropriate combinations of hardware, software and/or firmware. In different processor implementations, the circuitry of TMP module 140 may be implemented in a standalone fashion to act as an interface between shared cache 130 and a given memory coupled to processor 100 such as a dynamic random access memory (DRAM) or other such system memory. In other cases, TMP module 140 may be implemented within an integrated memory controller of processor 100 that acts to provide an interface and control for the associated memory. In yet other cases, TMP module 140 may be implemented within a memory execution engine (MEE) that may be part of a trusted portion of processor 100 such as circuitry within a security coprocessor, manageability engine or so forth configured to operate in a trusted execution environment (TEE). Of course other implementations of TMP module 140 and its constituent components are possible.

With further reference to FIG. 1, TMP module 140 itself is implemented with various individual circuits or components. As described further herein, module 140 may include a variety of different logic units configured with appropriate hardware, software and/or firmware. As illustrated, an encryption/decryption logic 142 may be configured to perform encryption and decryption operations for TMP purposes. In addition, an integrity validation logic 144 may be configured to perform integrity validation functions as described herein. More specifically, integrity validation logic 144 may generate an integrity value for given portions of data to be sent to the memory. In one embodiment, integrity validation logic 144 may be configured to generate a MAC for each corresponding portion of data. In addition, when data is returned from memory, integrity validation logic 144 may check the corresponding integrity value (e.g., by comparison with a validation integrity value generated based on the returned data) to verify that the data has not been compromised. A replay protection logic 146 may be configured to provide replay protection by way of re-keying or other re-authentication operations, which in an embodiment may be performed according to a predetermined schedule or after predetermined time periods. Still further, an arbitration logic 148 may be configured to perform arbitration operations between a variety of different memory operations, including read and write operations, as well as re-keying operations such as performed as described herein.

As further shown in FIG. 1, TMP module 140 may include a variety of storages. Specifically shown in TMP module 140 is a key storage 143 and a TMP cache memory 145. Key storage 143 may be configured to store keys used to generate MACs. In an embodiment in which re-keying is performed to provide rollback protection, key storage 143 may include at least two entries, each to store one of two keys, where a first key is an old key that was used to encrypt MACs and a second key is a new key used to perform a re-keying operation as MACs within a storage undergo a re-keying cycle. In some cases, upon completion of a full re-keying cycle, the old key may be deleted and a new key to be used for a next re-keying cycle may be stored in the first entry. As further shown in FIG. 1, TMP module 140 includes TMP cache memory 145. In an embodiment, cache memory 145 may be configured to store MACs such that off-chip access latency can be avoided for re-keying operations. Of course other TMP-associated data may be stored in TMP cache memory 145.

As further illustrated in FIG. 1, processor 100 may include other components such as a power control unit 150, which may be implemented in one embodiment as one or more microcontrollers to perform power management operations, such as the independent control of operating frequency and/or voltage for each of cores 110 and GPU 120. In addition, a security engine 160 may be present. In some cases, security engine 160 may be implemented as a separate coprocessor to perform security operations. In some cases, a TMP module may leverage certain capabilities of security engine 160, such as encryption capabilities. That is, in another embodiment, rather than having a dedicated encryption/decryption logic 142 within TMP module 140, encryption/decryption operations instead may be performed within security engine 160. Understand while shown at this high level in the illustration of FIG. 1, many variations and alternatives are possible.

Figure 2:
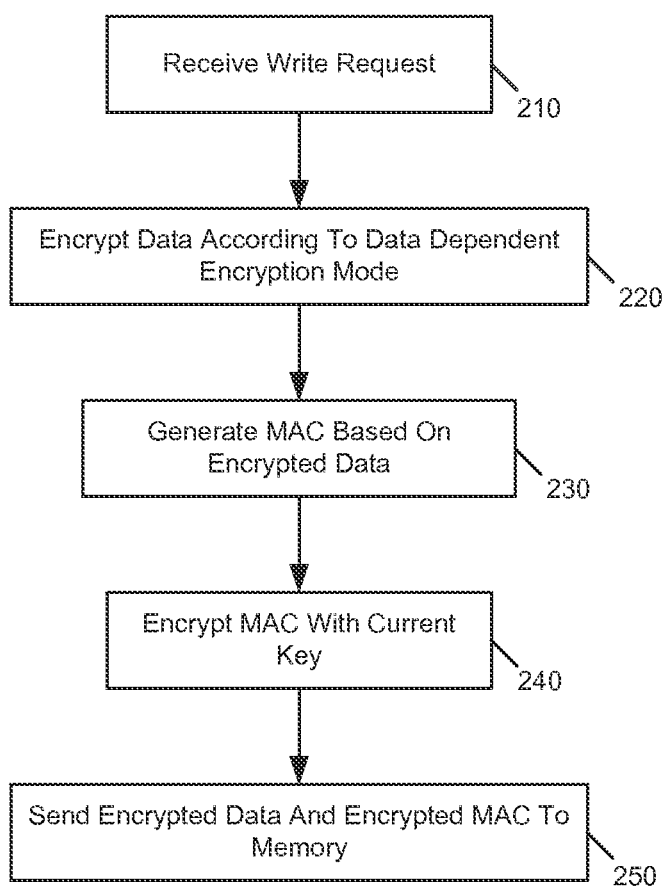
FIG. 2 is a flow diagram of a method for handling a write operation in accordance with an embodiment of the present invention.

Referring now to FIG. 2, shown is a flow diagram of a method for handling a write operation in accordance with an embodiment of the present invention. In the embodiment shown in FIG. 2, method 200 may be performed at least in part by a TMP module as described herein. Method 200 begins by receiving a write request (block 210). In an embodiment, such write request may be received responsive to execution of a write instruction to write a particular amount of data (e.g. a cache line width amount) to memory. Control next passes to block 220 where the data of the write request may be encrypted. More specifically, such encryption may be performed according to a data dependent encryption mode, such as using XEX-based tweaked-codebook mode with ciphertext stealing, so-called XTS-Advanced Encryption Standard (XTS-AES) encryption to provide confidentiality. Of course understand that in other embodiments different types of data dependent encryption modes may be used. More generally, any encryption scheme that does not incur storage overheads to provide confidentiality could be leveraged. Examples of such techniques include: electronic codebook (ECB), or other AES modes including LRW, XEX, counter mode or so forth.

Thereafter at block 230 a MAC may be generated based on this encrypted data. In various embodiments different MAC generation processes may be used. In one particular embodiment, a 56-bit MAC value may be generated for a cache line width of data to be written to the memory. Thereafter, this MAC value itself may be encrypted (block 240). More specifically, the TMP module may store a current encryption key, which in an embodiment may take the form of a 128-bit key. This current encryption key may be used to encrypt the MAC. Thereafter at block 250 the encrypted data and the encrypted MAC both may be sent to memory. In an embodiment, these different pieces of information may be sent under control of an arbitration logic, which may arbitrate these memory write operations with other memory operations. Understand while shown at this high level in the embodiment of FIG. 2, many variations and alternatives are possible.

Figure 3:
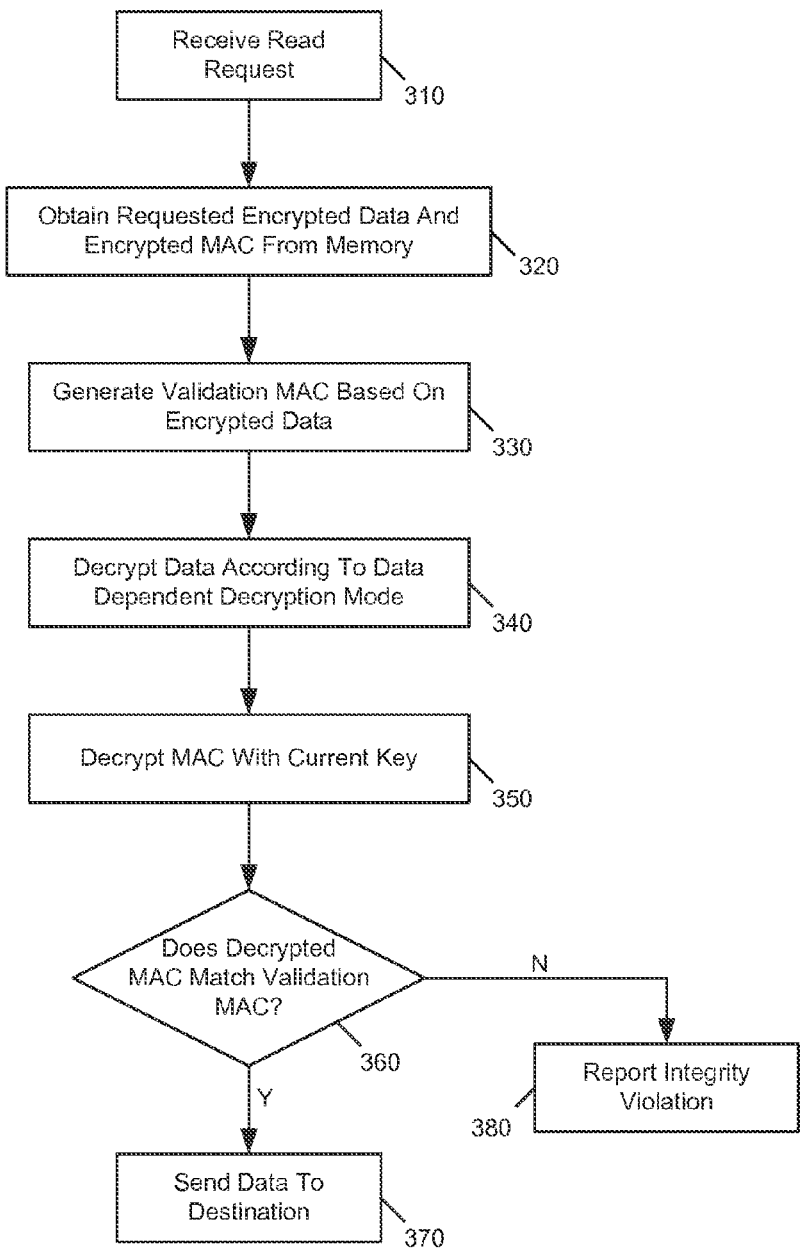
FIG. 3 is a flow diagram of a method for handling a read operation in accordance with an embodiment of the present invention.

Referring now to FIG. 3, shown is a flow diagram of a method for handling a read operation in accordance with an embodiment of the present invention. In FIG. 3, method 300 may be performed by a TMP module responsive to a read request such as a read instruction to read a particular data portion from the memory. As seen, method 300 begins by receiving a read request (block 310). Responsive to this request, control passes to block 320 where the encrypted data and a corresponding encrypted MAC may be obtained from the memory. Understand that such operations may be performed as scheduled by an arbitration logic, which arbitrates between these operations and other pending memory operations.

Thereafter various operations are performed to process the obtained information. Understand while shown with a linear flow for ease of illustration, in many embodiments various of these operations can be performed in parallel. Specifically, at block 330 a validation MAC may be generated. More specifically, this validation MAC may be generated based on the encrypted data. In an embodiment, the same operations as described above with regard to original MAC generation may be used to generate this validation MAC. As in the above example, e.g., a 56-bit MAC value may be generated using the encrypted data and a current encryption key. At block 340 the data itself may be decrypted according to a data dependent encryption mode. In accordance with the above discussion, in an embodiment an XTS-AES decryption may be performed. At block 350, the received encrypted MAC itself may be decrypted, also with the current key. Understand that these operations at blocks 330, 340 and 350 may be performed in parallel, in some cases.

Still with reference to FIG. 3, control next passes to diamond 360 where it is determined whether the decrypted MAC value matches the validation MAC value. If so, the integrity of the obtained data is verified and at block 370 the data is sent to the destination or requester (e.g., a core). Otherwise an integrity violation is reported (block 380) and thus the data is not provided to the destination. Understand that in some cases to reduce latency upon decryption, the data may be sent to the destination and if an integrity violation is thereafter determined (at diamond 360) the integrity violation report may be generated at block 380 and a fault signal may be sent to the destination to prevent the earlier sent decrypted data from being committed to a state of the machine. Understand while shown at this high level in the embodiment of FIG. 3, many variations and alternatives are possible.

To provide rollback protection, MAC values may periodically be re-keyed so that a compromised MAC value recorded at an earlier time cannot later be replayed (at least outside of a re-keying time window) without raising an integrity violation. Different manners of performing re-keying may be performed in different embodiments. In some embodiments, the original data used to generate an original MAC value (and the MAC value itself) may be used to generate a new or re-keyed MAC value. In other cases, a re-keyed or new MAC value can be generated without using the associated data, potentially reducing complexity, bandwidth requirements and so forth.

In an embodiment when the TMP module is idle, it starts traversing through the range of MACs with the new key, regenerating each MAC in the process. If there is not sufficient idle time to update the MACs dynamically, an urgency-based mechanism may be activated to schedule MAC updates. In this scenario, sets of MACs that are scheduled for an update with the new key may have an increasing urgency value calculated. In turn, an arbitration logic may compare MAC update access urgency values against other memory traffic urgency values, and when their urgency values becomes high enough, the re-keying operations will be selected, even if lower priority memory traffic is stalled. While this rollback prevention mechanism is non-deterministic, it is possible to define an upper bound on how long each key window might be live before an update occurs.

Using an embodiment, latency critical high-priority bursts of memory traffic will not be impacted by replay protection overheads, as at least some of the rollback protection overhead can occur during idle periods of memory traffic. Additionally, the arbitration-based technique allows low-priority memory accesses to be impacted first, while letting high-priority traffic proceed. Note that the rollback time window can be configured differently for applications having varying security and other features, trading off performance overheads for a shorter rollback window.

Figure 4:
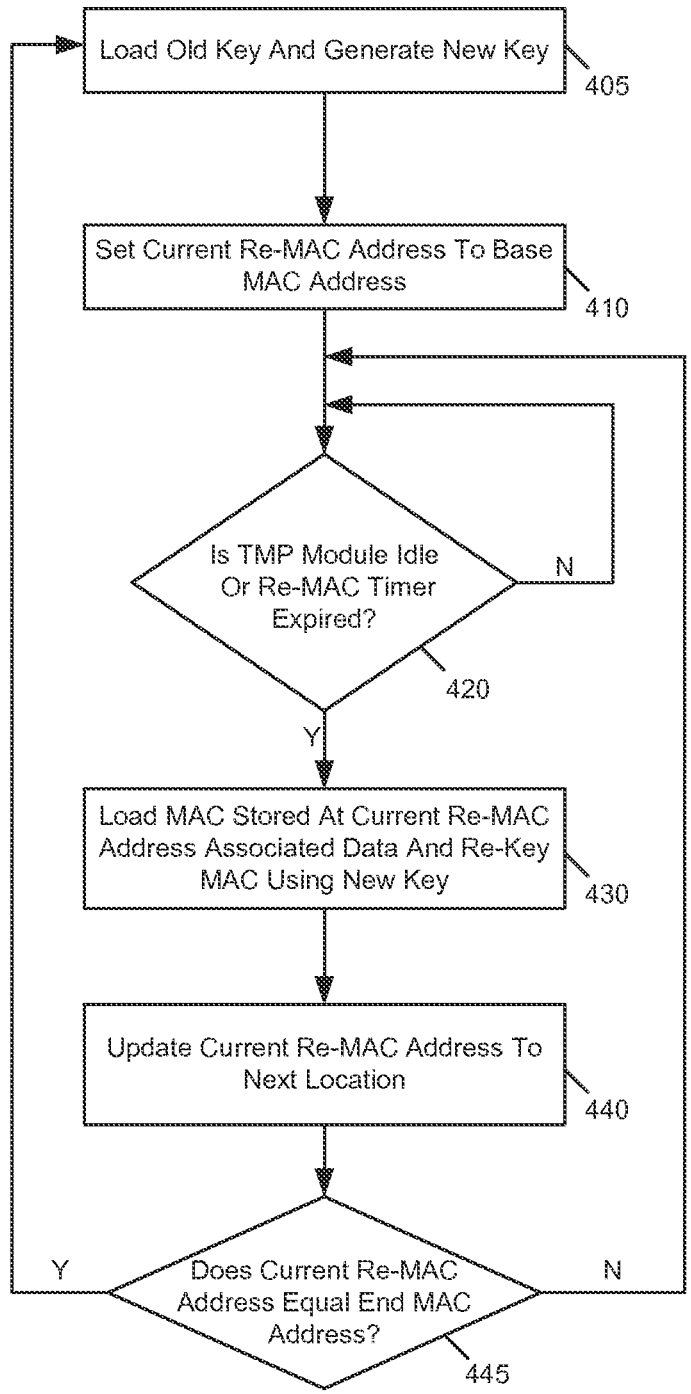
FIG. 4 is a flow diagram of a re-keying method in accordance with one embodiment of the present invention.

Referring now to FIG. 4, shown is a flow diagram of a re-keying method in accordance with one embodiment of the present invention. In the embodiment shown in FIG. 4, method 400 may be performed to re-key MAC values using both the original MAC value and its associated data. When using a keyed MAC algorithm the associated data lines are also to be loaded and used to perform a re-keying. That is, while only 10% of memory is re-keyed, the remaining memory is also loaded to compute the new MAC (which is data dependent) with the new key. In an embodiment, a TMP module may be configured to perform method 400. As seen, method 400 begins by loading an old key and generating a new key (block 405). In an embodiment, this old key may be stored in a storage of the TMP module itself. The new key may be generated according to common key generation practices, utilizing a random number generator, hardware specific seed, and some cryptographic primitives to increase the entropy of the key. Similarly, the new key also may be stored in a storage of the TMP module. At block 410, a current re-MAC address may be set to a base MAC address. This current re-MAC address acts as a pointer to a particular location in a storage that includes the MAC values, and the base MAC address may be the address within the storage at which the first generated MAC value is stored. In the embodiment of FIG. 4, this storage may be a system memory. In other cases, the memory may be a cache memory of the processor such as a dedicated MAC storage.

In any case, control next passes to diamond 420 to determine whether the TMP module is idle or a re-MAC timer has expired. In an embodiment, this re-MAC timer may be set at a configurable value to provide an appropriate level of rollback protection. Understand that the lower the value of this timer, the greater the protection that is afforded, while at the same time, the greater the impact on performance due to re-keying operations. In a particular embodiment, this re-MAC timer may be set on the order of approximately a given number of minutes (which may be on the order of many billions of processor clock cycles). If it is determined that this timer has expired or the TMP module is idle (and thus at an ideal time to perform re-keying), control passes to block 430. At block 430 a MAC stored in the current MAC address may be loaded, along with its associated data. Using this information, the MAC may be re-keyed and the resulting new MAC may be stored at the current MAC address. To perform this re-keying the MAC validation regenerates the original MAC based on the original key and data. If the regenerated MAC matches the MAC loaded from memory, then the validation is successful and a new MAC may be generated. The new MAC is generated based on the new key and data. The new MAC is then written back to memory, replacing the original MAC.

Next control passes to block 440 where the current re-MAC address may be updated to a next location to provide a pointer to the next MAC stored in the memory. Control passes then to diamond 445 to determine whether the current MAC address reaches the end of the region of memory holding the MAC values. If so, the current iteration of re-keying is completed and control passes back to block 405 above, to be performed during a next re-keying iteration. Otherwise, control passes to diamond 420 where a re-keying operation for a next MAC within the storage is performed.

Figure 5:
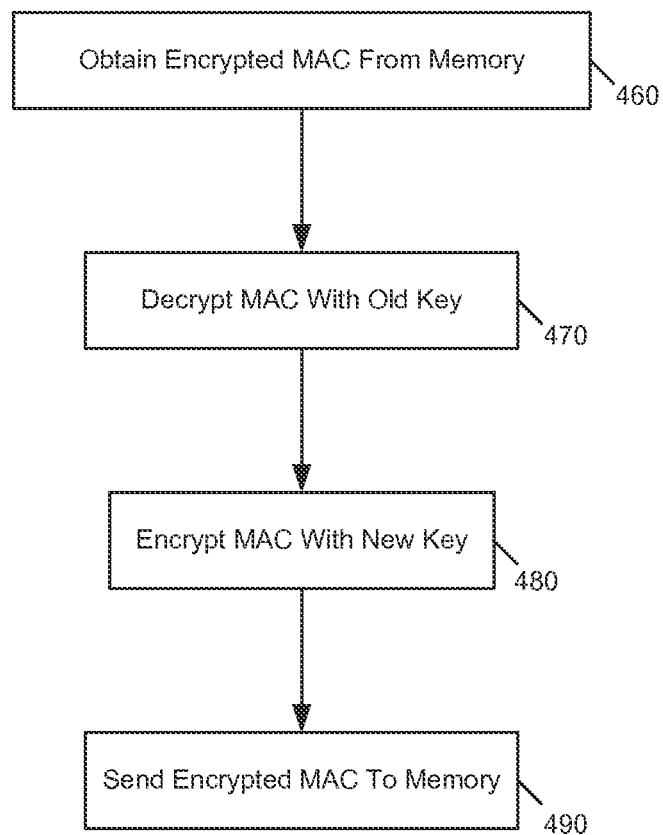
FIG. 5 is a flow diagram of a re-keying method in accordance with another embodiment of the present invention.

As discussed above the re-keying of FIG. 4 uses both the original MAC value and the associated data and thus the bandwidth of obtaining the data is incurred. In other cases, a re-keying operation may be performed without the associated data. In this example, a MAC algorithm such as a SHA or MD5 algorithm may be used. However, the final MAC is generated by encrypting this MAC value with the current MAC key. This differs from a standard keyed MAC construction (e.g., SHA-based HMAC) as the data need not be available for re-keying. In other embodiments, variants of SHA may be used such as SHA1, SHA2, SHA3, and so forth), and in an embodiment a SHA3 may be an appropriate secure hash function for use. Referring now to FIG. 5, shown is a flow diagram of a re-keying method in accordance with another embodiment of the present invention. In the embodiment shown in FIG. 5, method 450, which may also be performed by the TMP module, may perform re-keying without the associated data.

As illustrated, method 450 begins by obtaining an encrypted MAC from memory (block 460). At block 470 this MAC may be decrypted using the old key. Thereafter, the MAC is encrypted with the new key (block 480). Finally, at block 490 the encrypted MAC is sent back for storage in memory. As illustrated, this re-keying performed without the associated data may be more efficient in terms of computation complexity and reduced bandwidth consumption. As with the above method 400, understand that the re-keying shown in method 450 may be performed iteratively for all MACs stored in the given MAC storage and in addition, these re-keying operations may be performed during idle periods of the TMP module and/or when a re-keying timer has expired.

Embodiments thus may be used to detect a rollback. Consider the following scenario:

DL1: Data line value at time t1
DL2: Data line value at time t2
MAC1: MAC associated with DL1
MAC2: MAC associated with DL2
MACKEY1: MAC key at time t1
MACKEY2: MAC key at time t2

If an attacker records DL1 and MAC1 and replays them at time instant t2 (at which point the MAC key has been refreshed), the MAC check will fail as MAC1 was calculated over DL1 using MACKEY1, and the hardware will generate the MAC over DL1 using MACKEY2. Hence, a rollback will be detected. Further this rollback detection occurs based on a re-keying in which only the MAC is fetched from memory for the re-keying. Embodiments thus provide low-overhead confidentiality, integrity, and rollback protection for data in a system memory (and/or other off-chip memory).

Figure 6:
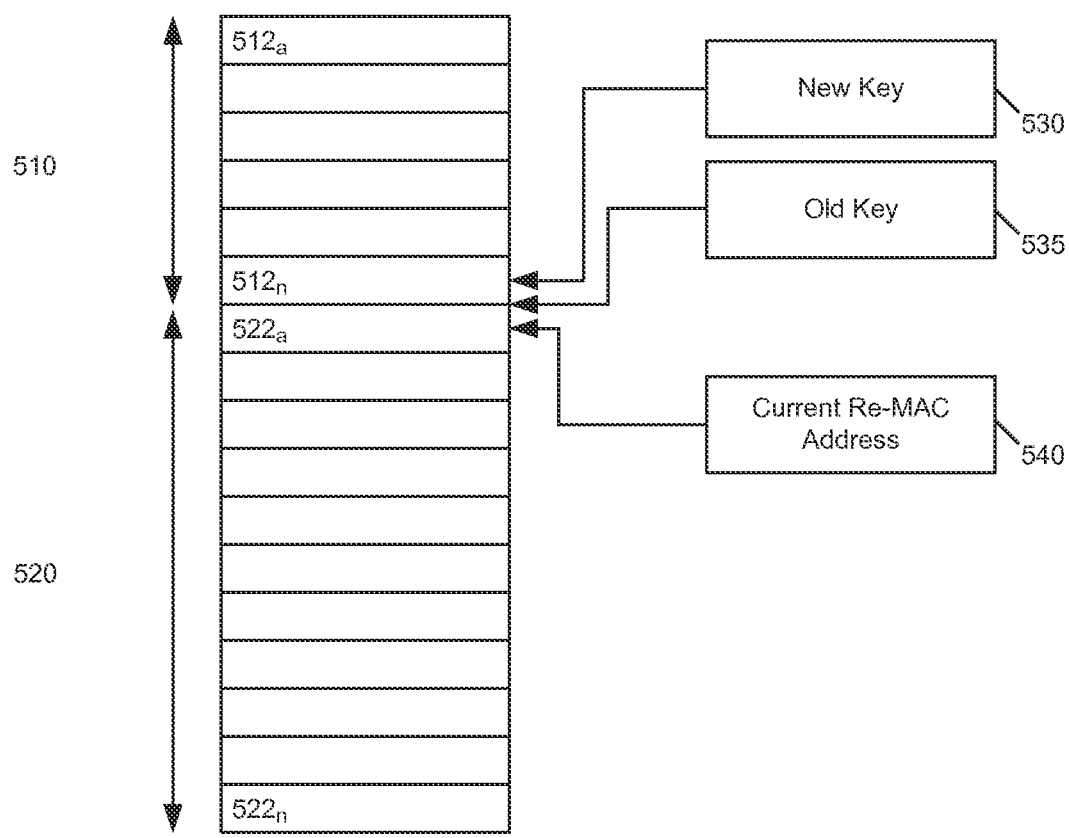
FIG. 6 is a block diagram of a MAC storage in accordance with an embodiment of the present invention.

Referring now to FIG. 6, shown is a block diagram of a MAC storage in accordance with an embodiment of the present invention. MAC storage 500 may be a dedicated cache memory of a processor (such as TMP cache 145 of FIG. 1) or a region of a system memory. As seen, MAC storage 500 includes a first region 510 to store re-keyed MACs and a second region 520 to store MACs generated with a prior key. Thus, entries 512a-512n store MAC values generated with a new key 530, while entries 522a-522n store MAC values generated using an old key 535. A pointer 540 points to a location of the MAC that is currently undergoing re-keying. Understand while shown at this high level in the illustration of FIG. 6, many variations and alternatives are possible. Furthermore, note that while FIG. 6 shows a MAC memory as a contiguous range, embodiments are not so limited. In other cases, MAC values may be stored at non-contiguous locations of a memory. However, understand that such MAC values may have a definite relationship to a corresponding associated data line address such that given a data line address, the corresponding MAC also can be accessed.

In further embodiments, the overhead of re-keying operations can be reduced by maintaining a cache memory (such as TMP cache 145 of FIG. 1) to track memory writes that have altered MAC values since a last in-memory re-keying operation. In this way, guaranteed replay protection is realized while reducing memory read latency for performing re-keying operations.

In an embodiment, this cache memory (e.g., a 64 kilobyte (KB) area) may be used to store cache lines that have been written back to memory since the last re-keying operation on the MAC table. This cache memory may be referred to as a tracker cache. Embodiments may use a hurry-up rollback technique to ensure this cache remains available. In an embodiment, the tracker cache can be filled with addresses and MACs of MAC lines affected due to writes to memory. As will be described further, different types of information can be stored in this tracker cache in different implementations.

Assume the tracker cache is full (storing, e.g., addresses: A1, A2, A3, A4). Assume also that another write request is received for another memory address (A5). This write operation is blocked (and may be stored, e.g., in a shared cache memory of the processor or other such buffer) since the tracker cache memory is full. Next, the MAC table is re-keyed until a cached address can be written back to memory (e.g., assume a re-keyed A1 and MAC line). Note that in various embodiments, multiple MAC lines may be re-keyed in a row with back-to-back memory writes. Now that an entry in the tracker cache is free, A5 and its MAC can be written to the tracker cache (storing, e.g., addresses: A5, A2, A3, A4) and data writes to memory are unblocked.

In various embodiments write operations may be blocked for a given time period (e.g., a predetermined time or a predetermined number of re-key operations) while the in-memory MAC table is re-keyed to free up entries in the tracker cache. In this way, embodiments provide replay protection without a version tree.

Different techniques to store MAC information may be used depending on platform characteristics. Assume an implementation with a 64 KB tracker cache, which covers 128 megabytes (MB) of memory. 128 MB is approximately 2 million protected cache lines. A 64 KB cache memory provides sufficient storage for 13107 cached MACs in the tracker cache. Given an implementation in which a dozen 40-bit MACs per data line are re-keyed at once (12 such MACs may fit on one cache line), on average, 13.3 MAC lines would be re-keyed to hurry-up to free the next available slot in the tracker cache.

By blocking write operations to memory for an average gap size (in this example waiting until 13.3 MAC lines are re-keyed per the assumptions above) to be rewritten with the current key, the maximum blocked write delay can be made to be constant and thus deterministic. As a generalization, every write operation to memory may be forced to wait for the in-memory integrity table to re-key N entries (where N=number of MAC lines in memory/tracker cache size). For another example, with 200K MAC lines (10 MACs per covering 2 million data lines or approximately 128 MB) and a 20K entry tracker cache, every write operation to memory may be blocked until 200/20=N=10 MAC lines in memory are first re-keyed. This control amortizes write latency so that it is constant/deterministic (e.g., 10 memory reads/writes). Note that while added latency is incurred for write operations, no performance penalty occurs as these writes do not affect performance. In contrast, read operations may not be delayed behind re-keying operations to maintain performance. It is also possible to continue to re-key the MAC lines in memory during read operations too (or just based on a time interval), so that individual writes need not be blocked by the average re-keying latency.

Figure 7:
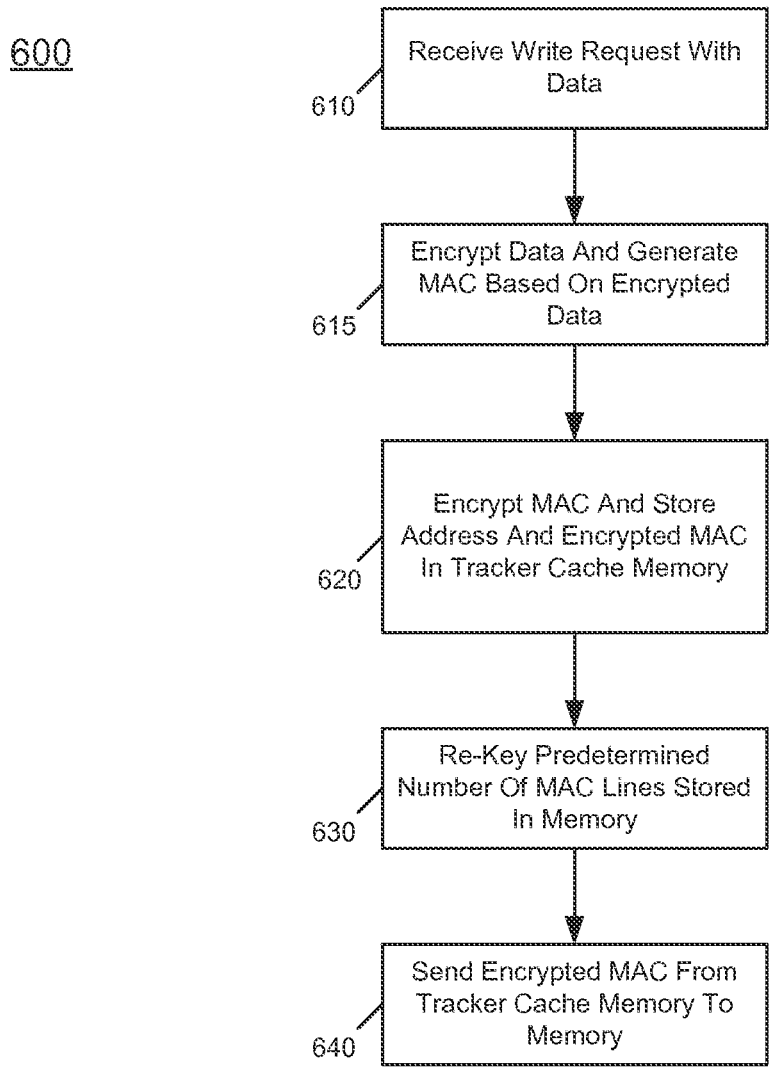
FIG. 7 is a flow diagram of a method in accordance with an embodiment of the present invention.

Referring now to FIG. 7, shown is a flow diagram of a method in accordance with an embodiment of the present invention. As shown in FIG. 7, method 600 may be performed using memory protection logic as described herein, in addition to a tracker cache memory.

As shown, method 600 begins by receiving a write request with data (block 610). This write request may be received from a core with a request to write a data line of information to memory. At block 615, the data may be encrypted (e.g., according to a given data dependent encryption mode). Still further, a MAC may be generated based on the encrypted data, as discussed above. Next at block 620 the MAC itself may be encrypted. In embodiments, a data dependent encryption mode also may be used for encrypting the MAC value (e.g., a XTS-AES encryption mode). Still further at block 620 this encrypted MAC value can be stored in the tracker cache memory.

Before the write of this MAC value (at least and potentially before a write operation to write the requested data) to memory is performed, a predetermined number of MAC lines stored in the memory may be re-keyed (block 630). As described herein, this predetermined number of MAC lines can vary depending on implementation. In a case, the predetermined number of MAC lines may be set to provide a deterministic write latency for writes to be sent to memory. After such re-keying operations are performed, control passes to block 640 where the encrypted MAC may be sent to memory (along with the encrypted data, if not previously sent).

Note that data writes can be cached (remain in a processor cache such as a shared cache memory) until a sufficient number of re-keys have completed. Performance may be improved by creating multiple sections of memory that are re-keyed independently. Note that while writes from cache to memory are temporarily blocked, the processor cache can still evict entries that were not modified (and therefore need not be written back to memory) to make room for additional reads from memory to the cache. Understand while shown at this high level in the embodiment of FIG. 7, many variations and alternatives are possible. For example, in other cases memory protection logic may include a storage to hold writes before they can be written back to memory. As one such example, a write tracker may be maintained, where write credits are not exposed to a system agent when the tracker is full, thus delaying writes.

Scaling to cover any memory size (beyond 128 MB) may be achieved by forming a hash tree such as a Merkle tree under a top level of MAC lines stored in the memory. With such arrangement, only the top level MAC lines are re-keyed, and the MAC hierarchy operates according to a tree structure.

Note that for this implementation and others, the tracker cache memory tracks addresses that changed (e.g., of the top level MAC line). As such, hardware treats the tracker cache memory as a cache that is looked up based on an address.

In one embodiment, the tracker cache memory stores the MAC of a MAC line that was changed in memory. That is, one of N MACs on the MAC line in memory was updated, and that change is tracked by calculating the MAC of all N MACs on the line. When memory is again read from the tracked MAC line, it can be confirmed that the MACs have not changed using the tracker cache MAC entry, before allowing the read to proceed.

In another embodiment, the tracker cache memory may store a counter used to encrypt a modified top level MAC line as part of an XTS tweak (using the current key for that MAC line). As with the MAC above, if the contents of the line have changed or were replayed with an old counter, then the MAC line will not decrypt correctly, thus corrupting the MAC values. When the MAC is calculated over the data, it will not match the corrupted value and therefore the corruption will be detected. Note that this embodiment may be more efficient than the above embodiment because counters can be much smaller than MACs, making the on-die tracker cache more area efficient.

In a still further embodiment, the tracker cache memory may store the MAC of a data line that was modified in memory. This MAC value is stored in the tracker cache and flushed back to memory when the corresponding MAC line is re-keyed. Note this embodiment may be efficient if there are common repeated reads to memory for entries already stored in the tracker cache memory, because the top level MAC value need not be looked up from memory if it is cached in the tracker cache memory (as compared to the above embodiments).

Thus for the first two embodiments of the tracker cache memory just discussed, lines from all MAC levels associated with an access request (e.g., read/write) are accessed, though they are only updated on a write. In the direct MAC storage embodiment, a L1 lookup can be avoided if the changed data MAC is already stored in the tracker cache memory.

Figure 8:
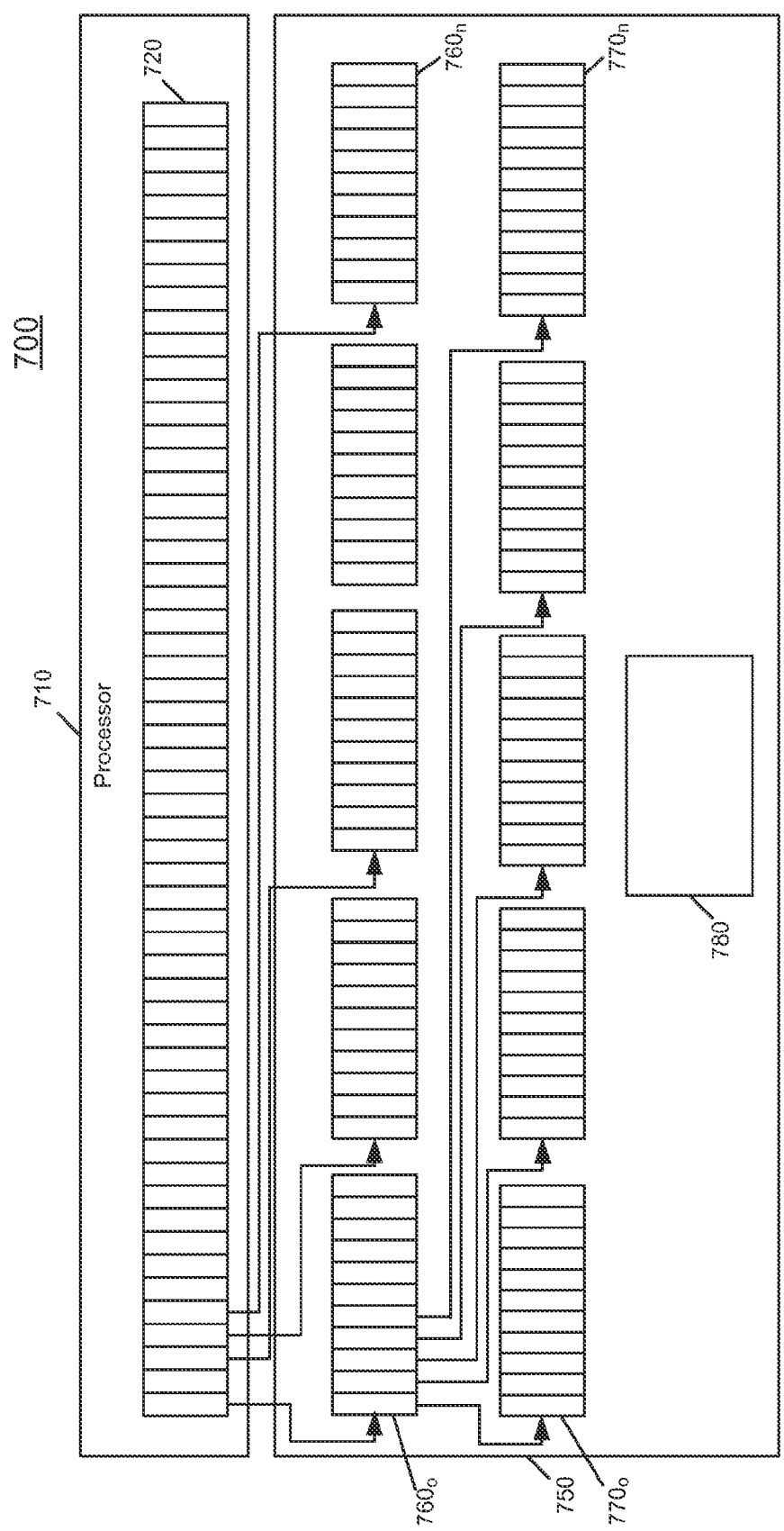
FIG. 8 is a block diagram of a portion of a system in accordance with an embodiment of the present invention.

Referring now to FIG. 8, shown is a block diagram of a portion of a system in accordance with an embodiment of the present invention. As shown in FIG. 8, system 700 at a high level includes a processor 710 (such as a multicore processor) and a system memory 750, which in an embodiment may be implemented as one or more DRAMs. To provide for efficient MAC re-keying operations, processor 710 includes a tracker cache memory 720. In the embodiment shown, each entry of tracker cache memory 720 may store a MAC value based on a given MAC line present in system memory 750. More specifically, in the implementation shown each entry in tracker cache memory 720 may store a MAC value that is generated based on a given one of a plurality of MAC lines $760_0$-$760_n$, which may be MAC lines of a first level of a two-level Merkle tree. In turn, each MAC value present in a given MAC line 760 of this first level of the Merkle tree is generated based on a given one of a plurality of MAC lines $770_0$-$770_n$, which may be MAC lines of a second level of the two-level Merkle tree. In turn, each MAC line 770 of the second level stores a plurality of MAC values, each for a given data line stored in a data region 780 of system memory 750. Understand while shown with this particular implementation in FIG. 8, a Merkle tree or other tree structure can be extended to additional levels to provide for efficiencies when protecting larger amounts of information.

In the embodiment shown in FIG. 8, with 12 MACs per L1 MAC line, 25,165,824 MACs cover 1,610,612,736 data bytes with a two-level Merkle tree. In this implementation, the L2 MAC lines do not need to be re-keyed and therefore cannot be replayed. Similarly, MACed data lines do not need to be re-keyed. Note there can be any number of MAC levels stored in memory; the deeper the tree, the more memory can be protected (at the expense of performance due to additional memory lookups due to the deeper tree).

Note that in different implementations, the tracker cache memory may be configured to store either MACs of the L1 MAC lines that changed due to a write (that is, a single MAC value covering all 12 40-bit MACs stored in a L2 MAC line), or to store the data line MACs directly.

Referring again to FIG. 8, processor 710 includes a tracker cache memory 720. In another embodiment, each entry of tracker cache memory 720 may store a counter/tweak value used to encrypt a given MAC line present in system memory 750. More specifically, in this implementation, each entry in tracker cache memory 720 may store a counter/tweak value that corresponds to one of MAC lines $760_0$-$760_n$. When a write occurs to memory that affects one of the MACs stored in one of MAC lines $760_0$-$760_n$, the tracker cache entry counter corresponding to that MAC line increments this counter/tweak value, and this counter/tweak value is used as a tweak to the XTS encryption of the affected MAC line, effectively re-encrypting it to a different ciphertext value. If there was no existing tracker cache entry for the affected MAC line, then a new entry is created with an initial counter/tweak value. This counter/tweak value is stored in the tracker cache until the MAC line is re-keyed with a new key, at which point the entry in the tracker cache can be freed.

In particular to this embodiment, it is noted that the re-keying operation itself (as applied to MAC lines $760_0$-$760_n$) can be viewed as a global counter/tweak value that is used to refresh the ciphertext of each MAC line entry. In other words, the key does not have to change, just the tweak value (so long as the combination of tweak values are always unique for a given key). Thus the old/new key values stored in storages 530, 535 (of FIG. 6) could simply be a global counter value, where the old key is the current counter value −1. In this way counter mode encryption may be used (where the counter is the concatenation of {Global Counter, Tracker Cache Counter, MAC line address}, producing a unique 128-bit counter value that never repeats for the same key. Example flows for such operations are described below with regard to FIGS. 11-12.

Figure 9:
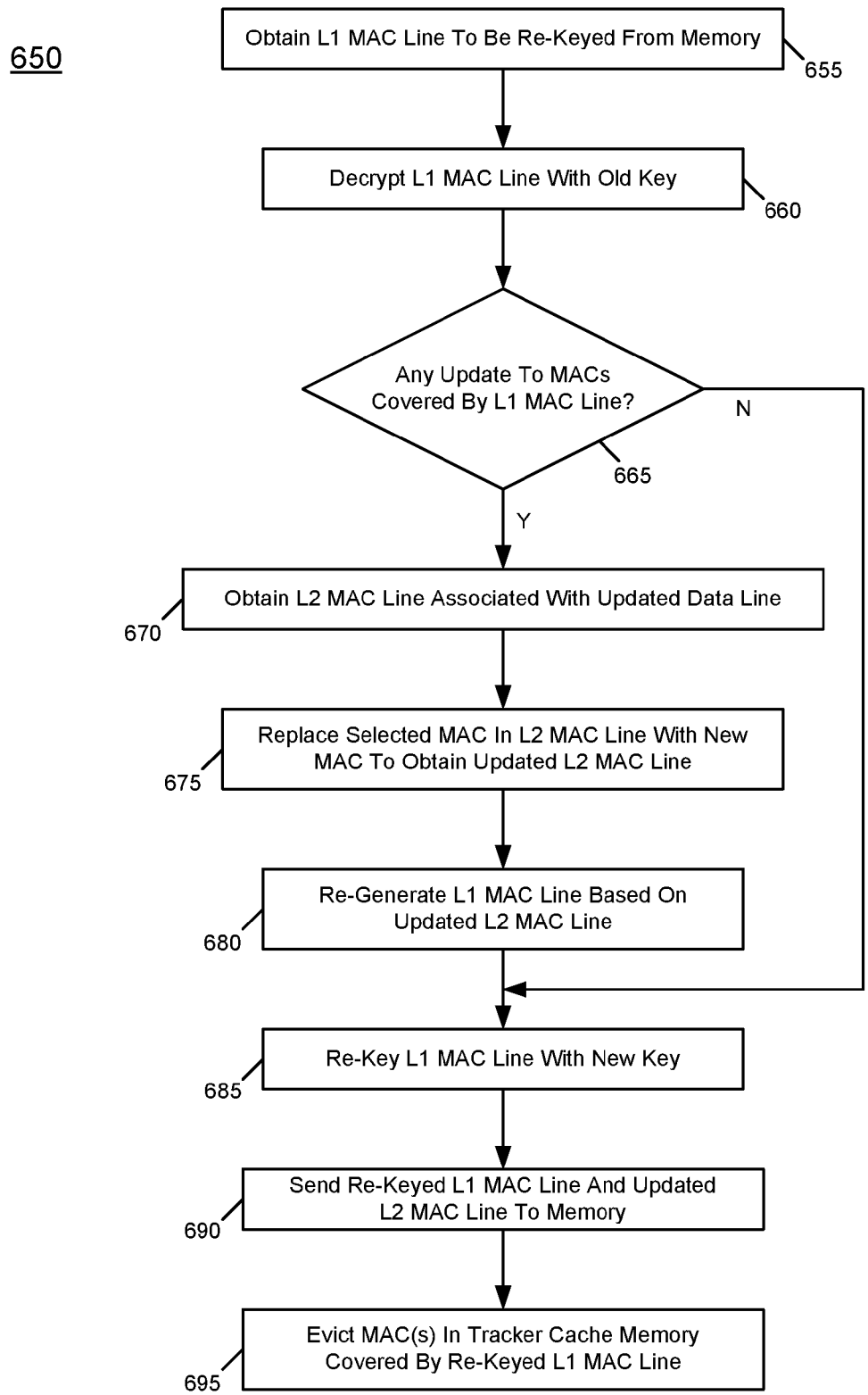
FIG. 9 is a flow diagram of a method for performing a re-keying operation accordance with another embodiment of the present invention.

Referring now to FIG. 9, shown is a flow diagram of a method for performing a re-keying operation accordance with another embodiment of the present invention. As shown in FIG. 9, method 650 may be performed by memory protection logic as described herein. As seen, method 650 begins by obtaining a first level (L1) MAC line to be re-keyed (block 655). This L1 MAC line may be obtained from the system memory. Next at block 660, the MAC line is decrypted using the old key. Next it can be determined whether any update has occurred to the MACs covered by this L1 MAC line (diamond 665). In an embodiment, reference to the tracker cache can be made to determine whether any update has occurred. If so, control passes to block 670 where a second level MAC line (L2) MAC line associated with this MAC update, e.g., due to a write to memory for a covered line, may be obtained. Then at block 675 a selected MAC in this L2 MAC line may be replaced with a new MAC. Understand that this new MAC replaces an entry within the L2 MAC line associated with the data line written to memory. Thereafter at block 680 the L1 MAC line may be re-generated based on this updated L2 MAC line.

Still with reference to FIG. 9, from both of diamond 665 (if no update to covered data lines has occurred) and block 680, control passes to block 685 where the L1 MAC line can be re-keyed with the new key. Thereafter, at block 690 the re-keyed L1 MAC line (and an updated L2 MAC line, if present) can be sent to the system memory. Finally, at block 695 any MACs within the tracker cache memory covered by this re-keyed L1 MAC line may be evicted. Understand while shown at this high level in the illustration of FIG. 9, many variations and alternatives are possible.

During execution of certain workloads, there may be high locality in workload writes, but few of the exact same addresses are repeatedly hit. In some cases, as much as 80% of the writes will affect the cached MAC of an already cached MAC value (in the tracker cache memory), reusing the same slot in the tracker cache memory. As such, approximately 80% of the writes in such workload do not need to be blocked. Thus, the aggregate latency per write can be dropped by nearly half. Note that with a larger tracker cache memory size, write latency may be further reduced.

To hide collisions of MACs within the MAC lines, embodiments may provide a counter/salt value associated with one or more MACs to ensure that an encrypted value of a MAC line is modified each time a new MAC value is written. Understand that in different embodiments, other manners of providing this counter mechanism can be implemented. With this enhancement, an adversary cannot compare in-memory MAC lines to find a probable collision due to a birthday attack.

Figure 10:
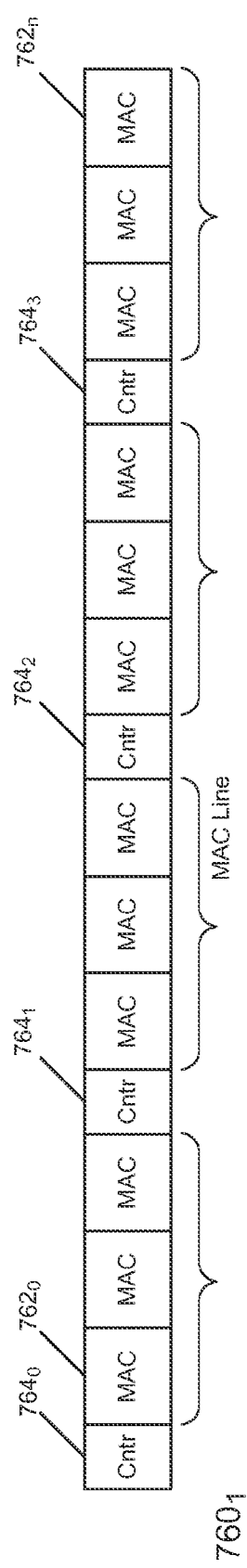
FIG. 10 is an illustration of a counter-based rollback prevention technique in accordance with an embodiment.

Referring now to FIG. 10, shown is an illustration of a counter-based rollback prevention technique in accordance with an embodiment. As illustrated, an encrypted MAC line $760_1$ is a MAC line of a top level of a Merkle tree or other data structure used to store MAC values hierarchically. In turn, MAC line $760_1$ includes a plurality of individual MAC values $762_0$-$762_n$, each of which may be a MAC generated based on a MAC line of the next level of the Merkle tree. Further, a plurality of counters $764_0$-$764_3$ are present, each associated with multiple MAC values 762. In the embodiment shown in FIG. 10, a given counter 764 associated with a set of MAC values 762 is updated (e.g., incremented) if any one of the associated MAC values was changed.

In the embodiment shown in FIG. 10, an 8-bit counter and 40-bit MAC value in an encrypted MAC provides approximately 28 bits of collision resistance. Of course, understand that other sizes of MAC values and/or counters may exist in other examples.

In other embodiments, instead of storing MAC values, the tracker cache memory may store counters for MAC lines modified by write operations since a last re-keying operation. Understand that in such embodiments, this counter can be made much smaller than a MAC value (e.g., from a 40-bit MAC value to an 8-bit counter), allowing more entries to fit in the same tracker cache memory. This counter in turn may be incremented each time a write is observed modifying the same MAC line. The counter value in turn is included in an encryption via the XTS tweak (including the address of the MAC line) of the corresponding MAC line, resulting in a different ciphertext each time an encryption is performed. If an adversary were to replay an old MAC line for the wrong counter value, then the MAC line would not decrypt properly, thus corrupting the MACs and causing them to not match the corresponding data lines, exposing the replay attack. With the above embodiments, when a re-keying operation completes for an affected MAC, the tracker cache memory can evict counter values for the previous key.

Similarly, other embodiments can replace intermediate layers of a Merkle Tree with a version tree (e.g., a tree of monotonically increasing counter values). Here the memory structures may be formed with counter values instead of MACs, with only the last layer of the structure having MAC values. The counter values can be XTS encrypted using a previous parent counter value as a tweak (including the encrypted line's address). The last level of counters is then used as a tweak to encrypt the last stage MAC line (along with its address). If any of the ciphertext counter values are modified or replayed, the chain of decrypted counters used as the tweak for the next level will not match. The result will ultimately corrupt the last stage MAC values, which will expose the attack when the MAC values do not match data. Because counters can be made smaller than MACs, more counters can fit on a line in memory, allowing a more efficient data structure with lower memory overhead.

In some embodiments, optimized re-keying operations can be realized where frequently updated (written to) pages in memory may be clustered together in the same physical range. In some cases, an operating system (OS) mapping mechanism may be leveraged to identify such region(s) and direct write operations to a given write memory region. With this mapping, MAC values associated with this smaller memory range can be frequently re-keyed while MAC values for typically read-only regions can avoid re-keying as described herein. Memory protection logic as described herein can adaptively expand a high frequency (e.g., writable) memory range as workload write characteristics change, increasing only the write latencies as it does so.

Figure 11:
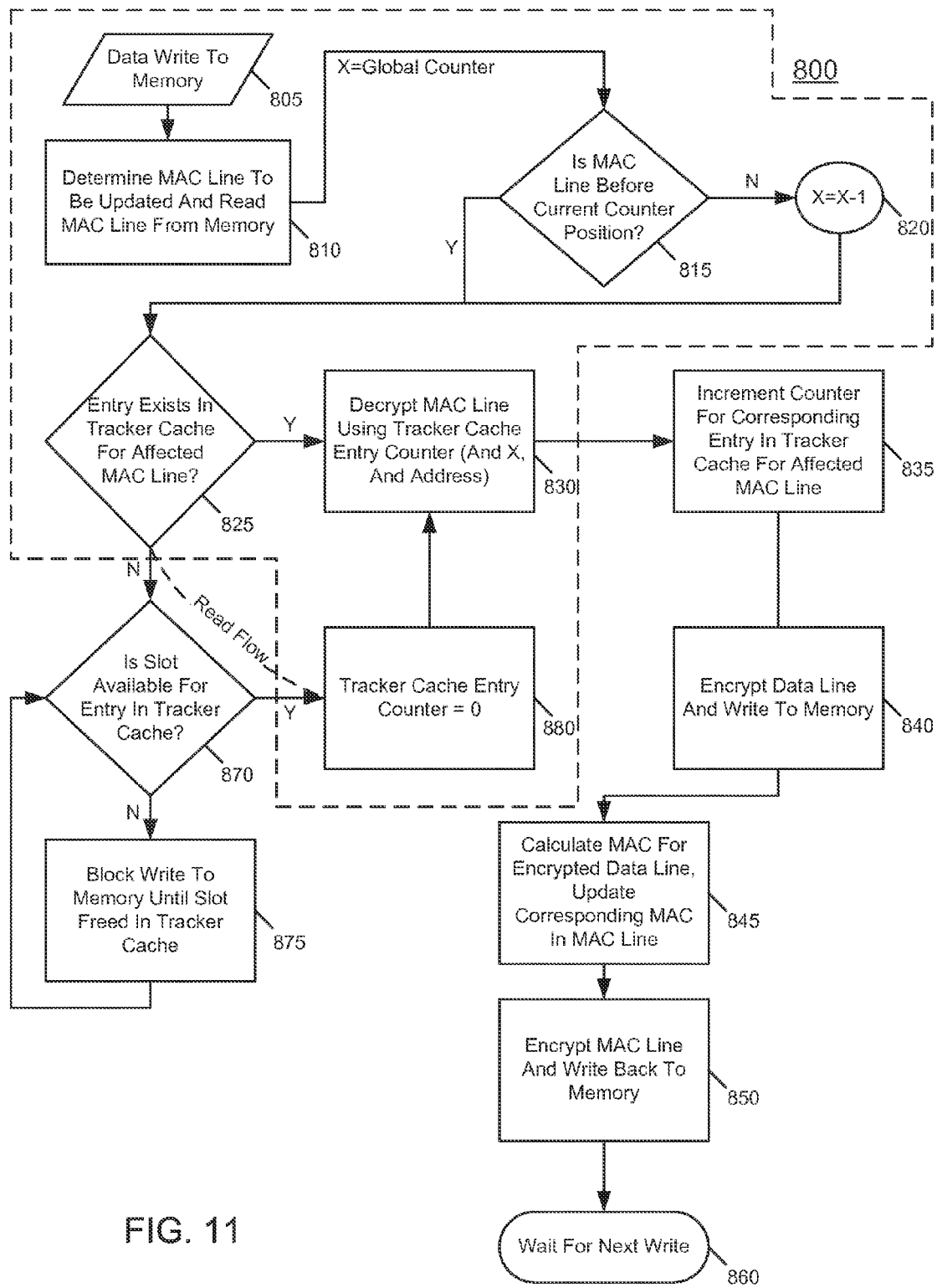
FIG. 11 is a flow diagram of MAC-based read and write operations in accordance with another embodiment.

Referring now to FIG. 11, shown is a flow diagram of MAC-based read and write operations in accordance with another embodiment. More specifically, method 800 shown in FIG. 11 describes an example of read or write operations to a memory protected in accordance with the TMP techniques described herein (and which may be performed by the described memory protection logic). As seen, operations within dashed portions of method 800 are common for both read and write flows. Method 800 begins by receiving a data write request to memory (block 805) (which could equally be a data read request). Next at block 810 a MAC line to be updated is determined and the corresponding MAC line is read from memory. And a variable X is set equal to the value of a global counter. Next it is determined whether the MAC line is before a current counter position (associated with a re-key pointer) (diamond 815). If not, the value of X is decremented (block 820).

From both of diamond 815 and block 820, control passes to diamond 825 where it is determined whether an entry already exists in the tracker cache for the affected MAC line. If so, control passes to block 830 where the MAC line may be decrypted using the tracker cache entry counter (and the value of the global counter and the address). In an embodiment, this counter-mode based decryption may use a global key (gk) as follows: AESgk{X, Tracker Cache Entry Counter, MAC line block address}, which is then exclusively-OR'ed (XOR'ed) with the MAC line. Note that in the case of a read flow, after block 830 the decrypted MAC value is compared with the MAC value for the associated data line to determine if it is a match (that is, no replay or corruption occurred).

Next (for a write operation) control passes to block 835 where the counter is incremented for the corresponding entry in the tracker cache for the affected MAC line. Thereafter, the data line is encrypted and written to memory (at block 840). Thereafter, at block 845 the MAC for the encrypted data line is calculated and the corresponding MAC in the MAC line is updated (block 845). At block 850, the MAC line may be encrypted and written back to memory. As above, a counter mode-based encryption using the global key gk (as discussed above) may occur to encrypt the MAC line. Thereafter, control passes to block 860 to wait for a next write.

Still with reference to FIG. 11, if instead at diamond 825 it is determined that there is no tracker cache entry for the effective MAC line (for a write operation), control passes to diamond 870 to determine whether a slot is available for entry into the tracker cache. If so, control passes to block 880, where the tracker cache entry counter may be set to 0. Note that control passes directly from diamond 825 to block 880 for a read flow.

Still with reference to FIG. 11, if instead no slot is available as determined at diamond 870, control passes to block 875 where the write to memory may be blocked until a slot is freed in the tracker cache. Understand while shown at this high level in the embodiment of FIG. 11, other variations may occur in performing write and read memory operations.

Figure 12:
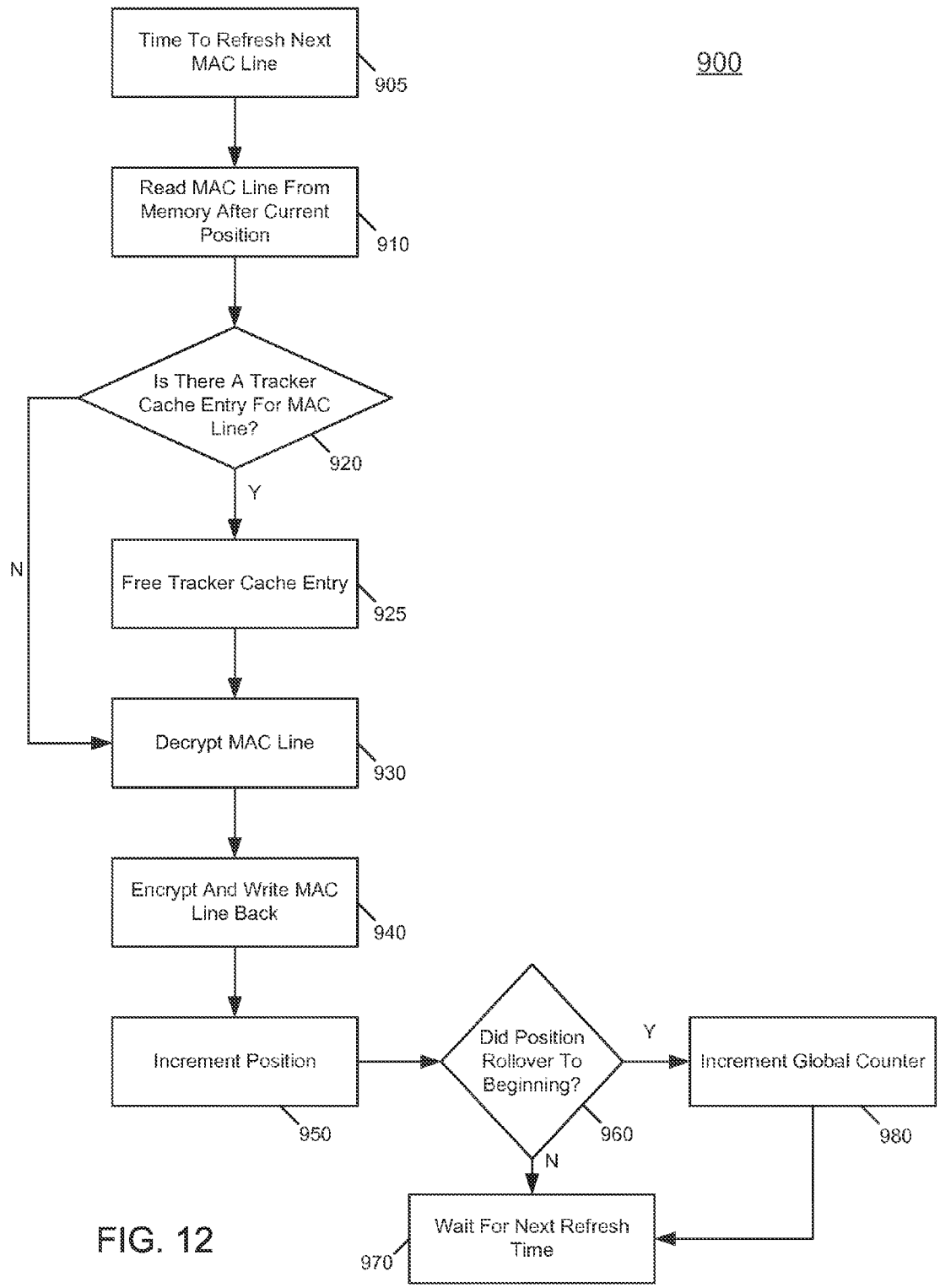
FIG. 12 is a block diagram of a method for performing re-keying or refreshing of a MAC line in accordance with another embodiment of the present invention.

Referring now to FIG. 12, shown is a block diagram of a method for performing re-keying or refreshing of a MAC line in accordance with another embodiment of the present invention. As shown in FIG. 12, method 900, which may be performed by memory protection logic as described herein, begins at block 905 by determining that it is time to refresh a next MAC line. This determination may be based on a timer expiration, or may be part of a set of re-keying operations performed prior to allowing a write operation to proceed. In any case, at block 910 a MAC line is read from memory after a current pointer position. Note that in an embodiment, a global counter value may correspond to the prior refreshed MAC line, and a decremented value of the global counter (Global Counter −1) corresponds to the previous counter value.

Next at diamond 920 it is determined whether there is a tracker cache entry present for the MAC line. If so, a value of X may be set for this counter value entry. At block 925, a tracker cache entry is freed. Thereafter, control passes to block 930 where the MAC line may be decrypted. Control also passes to block 930 directly from diamond 920 if there is no tracker cache entry for the MAC line, at which point the value of X may be set to 0. Note that in an embodiment, a counter mode-based decryption may be performed according to: AESgk{Global Counter −1, X, MAC line block address}, which is in turn XOR'ed with the value of the MAC line. Next, at block 940 the MAC line is encrypted and written back to memory. In an embodiment, a counter mode-based encryption may occur according to AESgk{Global Counter, 0, MAC line block address}, which in turn is XOR'ed with the value of the MAC line. Thereafter, at block 950 the pointer position is incremented and it is next determined whether the position has rolled over to the beginning (at diamond 960). If so, at block 980 the global counter may be incremented. In either case, control thereafter passes to block 970 where control may wait for a next refresh time. As with the above embodiment, this counter mode method alternately may be performed on a MAC line at a top of a Merkle tree (as in FIG. 8) or the top of a version tree containing additional counter values, to scale to protect any size memory.

Figure 13:
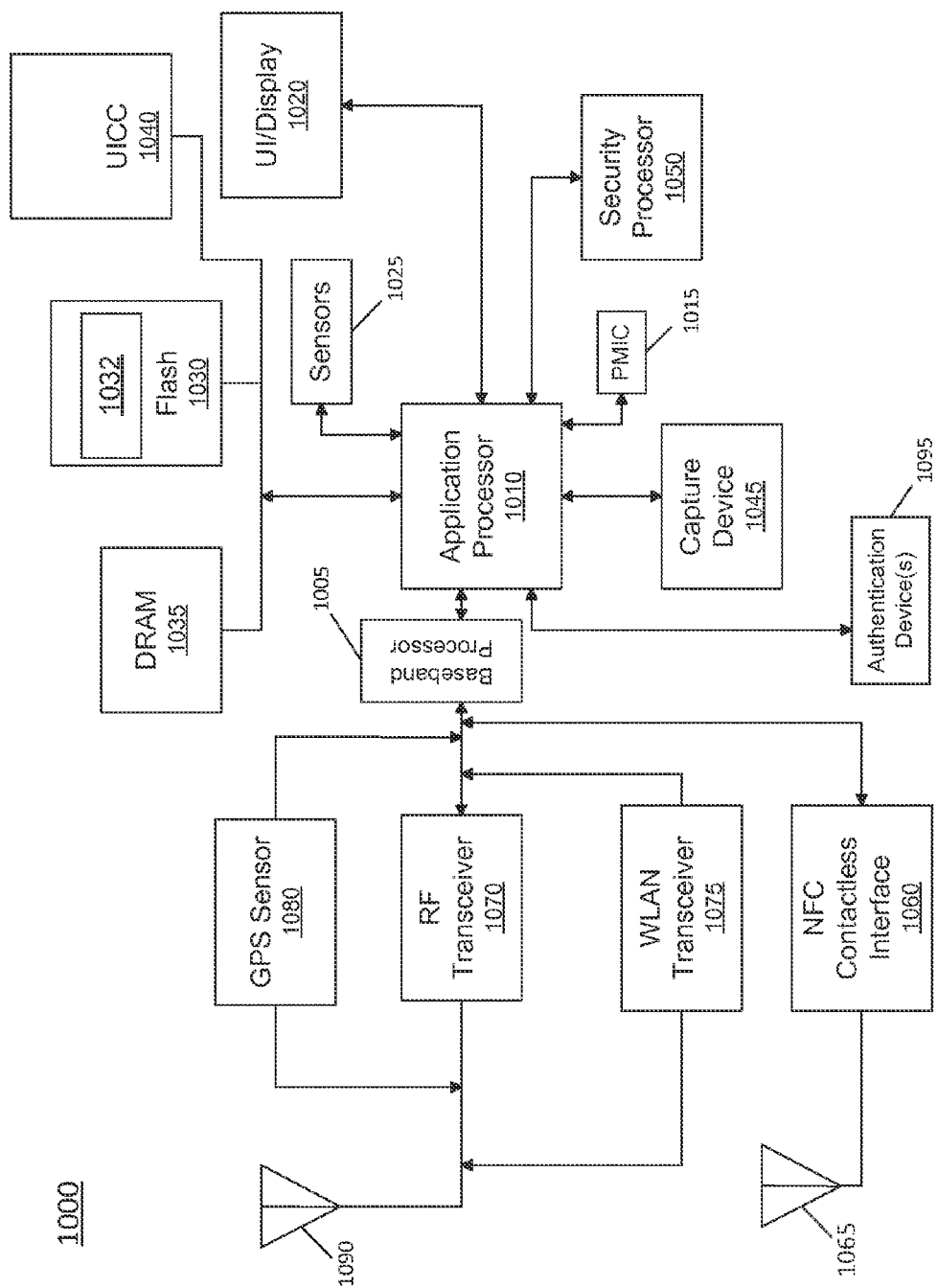
FIG. 13 is a block diagram of an example system with which embodiments can be used.

Embodiments may be implemented in an SoC or other processor for incorporation into a wide variety of platforms. Referring now to FIG. 13, shown is a block diagram of an example system with which embodiments can be used. As seen, system 1000 may be a smartphone or other wireless communicator. A baseband processor 1005 is configured to perform various signal processing with regard to communication signals to be transmitted from or received by the system. In turn, baseband processor 1005 is coupled to an application processor 1010, which may be a main CPU of the system to execute an OS and other system software, in addition to user applications such as many well-known social media and multimedia apps. Application processor 1010 may further be configured to perform a variety of other computing operations for the device. Application processor 1010 may include memory protection logic as described herein to protect information communicated for storage outside of the processor.

In turn, application processor 1010 can couple to a user interface/display 1020, e.g., a touch screen display. In addition, application processor 1010 may couple to a memory system including a non-volatile memory, namely a flash memory 1030 and a system memory, namely a DRAM 1035. In some embodiments, flash memory 1030 may include a secure portion 1032 in which MAC values as described herein may be stored. A similar region may be present in DRAM 1035. As further seen, application processor 1010 also couples to a capture device 1045 such as one or more image capture devices that can record video and/or still images.

Still referring to FIG. 13, a universal integrated circuit card (UICC) 1040 comprises a subscriber identity module, which in some embodiments includes a secure storage to store secure user information. System 1000 may further include a security processor 1050 that may couple to application processor 1010. In various embodiments, security processor 1050 may be used in part to set up a TEE. A plurality of sensors 1025 may couple to application processor 1010 to enable input of a variety of sensed information such as accelerometer and other environmental information.

In addition, one or more authentication devices 1095 may be used to receive, e.g., user biometric input for use in authentication operations.

As further illustrated, a near field communication (NFC) contactless interface 1060 is provided that communicates in a NFC near field via an NFC antenna 1065. While separate antennae are shown in FIG. 13, understand that in some implementations one antenna or a different set of antennae may be provided to enable various wireless functionality.

A power management integrated circuit (PMIC) 1015 couples to application processor 1010 to perform platform level power management. To this end, PMIC 1015 may issue power management requests to application processor 1010 to enter certain low power states as desired. Furthermore, based on platform constraints, PMIC 1015 may also control the power level of other components of system 1000.

To enable communications to be transmitted and received, various circuitry may be coupled between baseband processor 1005 and an antenna 1090. Specifically, a radio frequency (RF) transceiver 1070 and a wireless local area network (WLAN) transceiver 1075 may be present. In general, RF transceiver 1070 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1080 may be present, with location information being provided to security processor 1050 for use as described herein. Other wireless communications such as receipt or transmission of radio signals, e.g., AM/FM and other signals may also be provided. In addition, via WLAN transceiver 1075, local wireless communications, such as according to a Bluetooth™ or IEEE 802.11 standard can also be realized.

Figure 14:
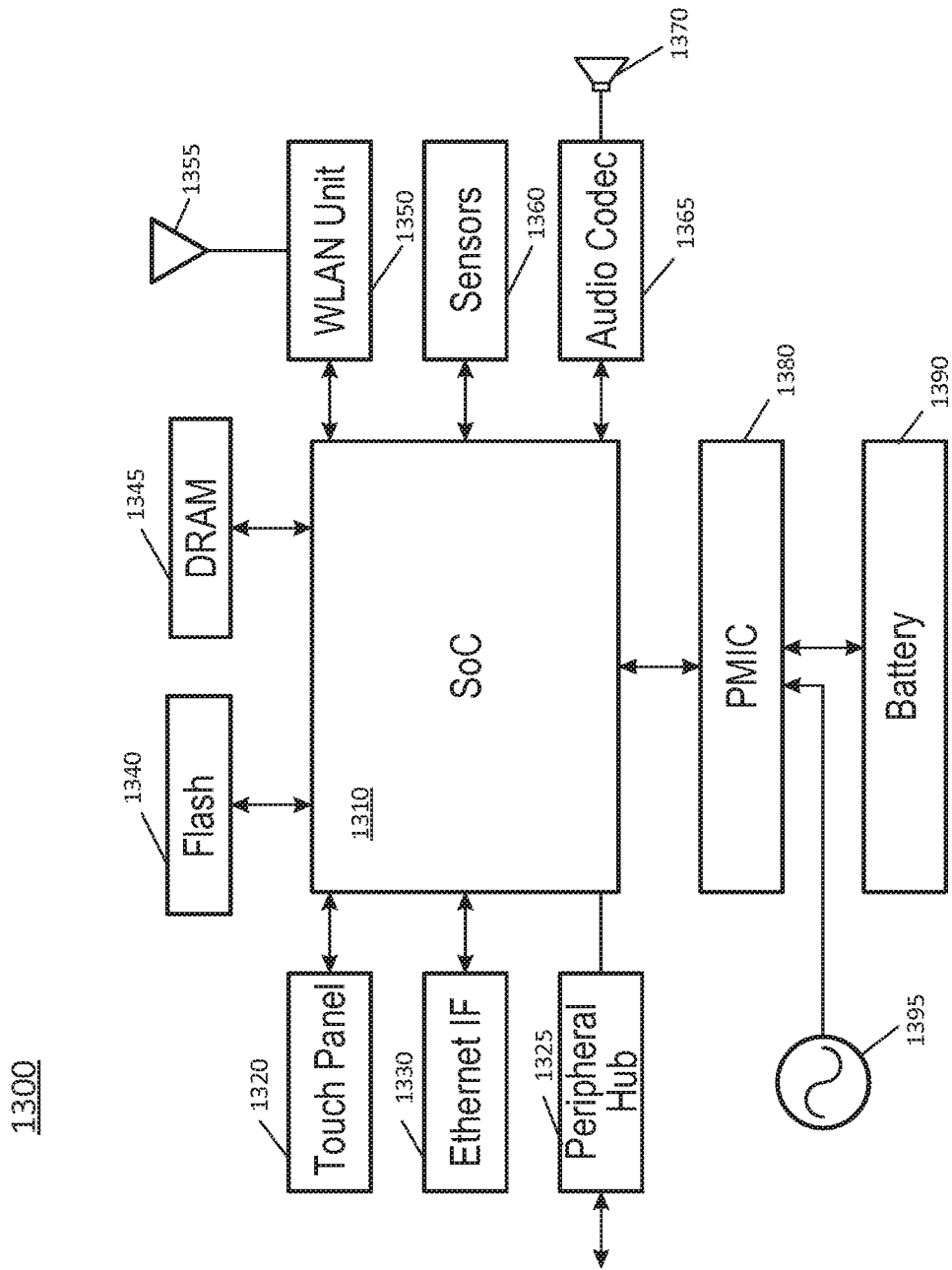
FIG. 14 is a block diagram of an example system with which embodiments may be used.

Referring now to FIG. 14, shown is a block diagram of an example system with which embodiments may be used. In the illustration of FIG. 14, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include hardware, software, and/or firmware as described herein to provide memory protection for storage of information external to SoC 1310.

A variety of devices may couple to SoC 1310. In the illustration shown, a memory subsystem includes a flash memory 1340 and a DRAM 1345 coupled to SoC 1310, both of which may be configured to store encrypted information, including data and MAC values. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based management, PMIC 1380 may further perform platform power management activities based on environmental and usage conditions. Still further, PMIC 1380 may communicate control and status information to SoC 1310 to cause various power management actions within SoC 1310.

Still referring to FIG. 14, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 14, many variations and alternatives are possible.

Figure 15:
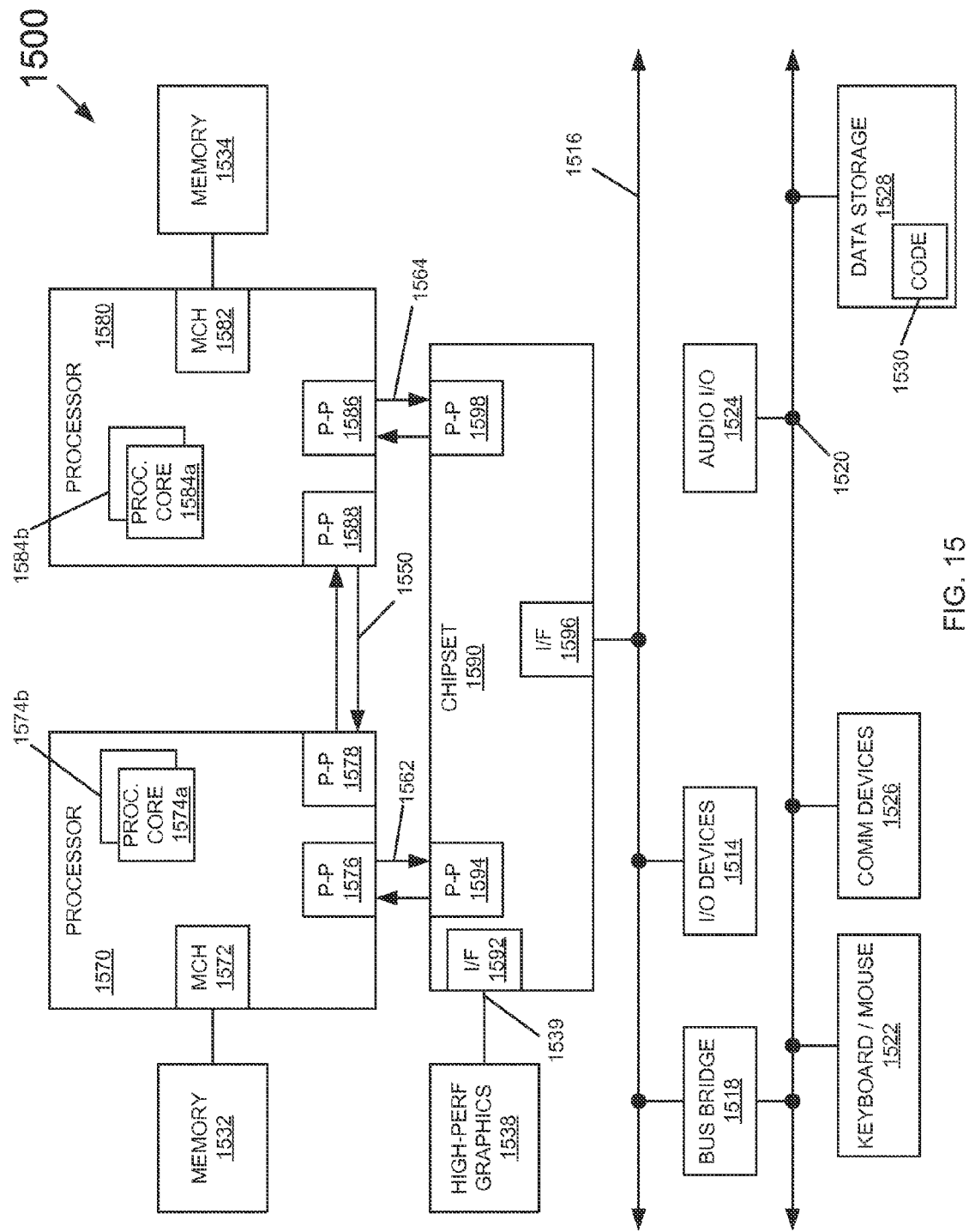
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include hardware and logic to perform the total memory protection techniques described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors, and which may be configured to store encrypted information as described herein. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530 and one or more manifests, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In Example 1, a method comprises: receiving, in a memory protection logic of a processor, a write request and a data block to be written to a memory coupled to the processor; encrypting the data block and generating a MAC based on the encrypted data; encrypting the MAC and storing the encrypted MAC in a tracker cache memory of the processor; performing a plurality of re-key operations, each on one or more MAC values stored in the memory, to re-key the one or more MAC values from association with a first key to association with a second key; and thereafter sending the encrypted MAC to the memory for storage in the memory.

In Example 2, the plurality of re-key operations comprises a predetermined number of re-key operations to provide a deterministic memory write latency.

In Example 3, in the method of Example 2, the deterministic memory write latency is to ensure that the tracker cache memory is not to be filled to capacity.

In Example 4, the method of one or more of the above Examples further comprises evicting an entry from the tracker cache memory associated with one of the re-keyed one or more MAC values.

In Example 5, the method of one or more of the above Examples further comprises encrypting the data block according to a data dependent encryption mode.

In Example 6, the method of Example 5 further comprises encrypting the MAC according to a data dependent encryption mode.

In Example 7, the method of Example 6 further comprises performing a first re-key operation to: obtain a first MAC block from a first level of MAC blocks stored in a MAC data structure of the memory; re-key the first MAC block to change association of the first MAC block from the first key to the second key, the re-keyed first MAC block encrypted according to the second key; and thereafter send the first MAC block to the memory for storage in the first level of MAC blocks.

In Example 8, the method of one or more of the above Examples further comprises: obtaining a first MAC block from a first level of MAC blocks stored in a MAC data structure of the memory; obtaining a second MAC block from a second level of MAC blocks stored in the MAC data structure; replacing one of a plurality of MACs stored in the second MAC block with the encrypted MAC, to update the second MAC block; and encrypting the updated second MAC block according to a data dependent encryption mode.

In Example 9, the method of Example 8 further comprises: generating an updated MAC value based on the encrypted updated second MAC block; encrypting the updated MAC value; replacing one of a plurality of MAC values stored in the first MAC block with the encrypted updated MAC value to obtain an updated first MAC block; re-keying the updated first MAC block with the second key; and storing the encrypted updated first MAC block in the memory.

In Example 10, the method of one or more of the above Examples further comprises: allowing one or more read operations to be performed ahead of at least some of the plurality of re-key operations; and preventing one or more write operations from being performed ahead of the plurality of re-key operations.

In Example 11, a machine-readable storage medium includes machine-readable instructions, when executed, to implement a method of any of the above Examples.

In Example 12, a processor comprises: at least one core to execute instructions; a cache memory coupled to the at least one core to store data; and a tracker cache memory coupled to the at least one core, the tracker cache memory including a plurality of entries each to store an integrity value associated with a data block to be written to a memory coupled to the processor, where the integrity value is to be stored in the tracker cache memory at least until an integrity value block stored in the memory and associated with the integrity value has been re-keyed.

In Example 13, the processor of Example 12 further comprises a memory protection logic to encrypt the data block before the encrypted data block is written to the memory.

In Example 14, the memory protection logic is to evict the integrity value from the tracker cache memory after the encrypted data block is written to the memory.

In Example 15, the memory protection logic is to configure the memory to store an integrity value data structure including a first level to store a first plurality of integrity value blocks and a second level to store a second plurality of integrity value blocks, where each of the first plurality of integrity value blocks includes a first plurality of integrity values, each an integrity value for one of the second plurality of integrity value blocks, and each of the second plurality of integrity value blocks includes a second plurality of integrity values each an integrity value for a data block stored in the memory.

In Example 16, one of the first plurality of integrity value blocks comprises a plurality of MAC values each associated with one of the second plurality of integrity value blocks and a plurality of counters each associated with one or more of the plurality of MAC values.

In Example 17, the memory protection logic is to update one of the plurality of counter values when an update occurs to a data block covered by a particular one of the one or more of the plurality of MAC values.

In Example 18, the memory protection logic is to allocate write data to a first region of the memory and to allocate read data to a second region of the memory, and to perform re-keying of the first region of the memory and not perform re-keying of the second region of the memory.

In Example 19, the integrity value associated with the data block comprises a counter value.

In Example 20, a system comprises: a processor having at least one core to execute instructions, a tracker cache memory coupled to the at least one core, the tracker cache memory including a plurality of entries each to store an integrity value associated with a data block to be written to a memory, where the integrity value is to be stored in the tracker cache memory at least until an integrity value block stored in the memory and associated with the integrity value has been re-keyed, and a memory protection logic; and the memory coupled to the processor, where the memory protection logic is to configure the memory to store an integrity value data structure including a first level to store a first plurality of integrity value blocks and a second level to store a second plurality of integrity value blocks, where each of the first plurality of integrity value blocks includes a first plurality of integrity values, each an integrity value for one of the second plurality of integrity value blocks, and each of the second plurality of integrity value blocks includes a second plurality of integrity values each an integrity value for a data block stored in the memory.

In Example 21, the memory protection logic is to perform a plurality of re-key operations, each on one of the first plurality of integrity blocks stored in the memory, to re-key one of the first plurality of integrity blocks from association with a first key to association with a second key.

In Example 22, the memory protection logic is to allow one or more read operations to be performed ahead of at least some of the plurality of re-key operations, and prevent one or more write operations from being performed ahead of the plurality of re-key operations.

In Example 23, an apparatus comprises: means for receiving a write request and a data block to be written to a memory coupled to a processor; means for encrypting the data block and generating a MAC based on the encrypted data; means for encrypting the MAC and storing the encrypted MAC in a tracker cache memory of the processor; means for performing a plurality of re-key operations, each on one or more MAC values stored in the memory, to re-key the one or more MAC values from association with a first key to association with a second key; and means for sending the encrypted MAC to the memory for storage in the memory.

In Example 24, the apparatus further comprises means for evicting an entry from the tracker cache memory associated with one of the re-keyed one or more MAC values.

In Example 25, the apparatus of one or more of the above Examples further comprises means for encrypting the data block according to a data dependent encryption mode and means for encrypting the MAC according to a data dependent encryption mode.

In Example 26, the apparatus further comprises means for allowing one or more read operations to be performed ahead of at least some of the plurality of re-key operations, and means for preventing one or more write operations from being performed ahead of the plurality of re-key operations.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable medium comprising instructions that when executed enable a system to:
   receive, in a memory protection logic of a processor of the system, a write request and a data block to be written to a system memory coupled to the processor;
   encrypt the data block and generate a message authentication code (MAC) based on the encrypted data;
   encrypt the MAC and store the encrypted MAC in a tracker cache memory of the processor;
   perform a plurality of re-key operations, each of the plurality of re-key operations on one or more MAC values stored in the system memory, to re-key the one or more MAC values from association with a first key to association with a second key; and
   send the encrypted MAC to the system memory for storage in the system memory.

2. The at least one non-transitory computer readable medium of claim 1, wherein the plurality of re-key operations comprises a predetermined number of re-key operations to provide a deterministic memory write latency.

3. The at least one non-transitory computer readable medium of claim 2, wherein the deterministic memory write latency is to ensure that the tracker cache memory is not to be filled to capacity.

4. The at least one non-transitory computer readable medium of claim 1, further comprising instructions that when executed enable the system to evict an entry from the tracker cache memory associated with one of the re-keyed one or more MAC values.

5. The at least one non-transitory computer readable medium of claim 1, further comprising instructions that when executed enable the system to encrypt the data block according to a data dependent encryption mode.

6. The at least one non-transitory computer readable medium of claim 5, further comprising instructions that when executed enable the system to encrypt the MAC according to a data dependent encryption mode.

7. The at least one non-transitory computer readable medium of claim 6, further comprising instructions that when executed enable the system to perform a first re-key operation to:
   obtain a first MAC block from a first level of MAC blocks stored in a MAC data structure of the system memory;
   re-key the first MAC block to change association of the first MAC block from the first key to the second key, the re-keyed first MAC block encrypted according to the second key; and
   send the first re-keyed MAC block to the system memory for storage in the first level of MAC blocks.

8. The at least one non-transitory computer readable medium of claim 1, further comprising instructions that when executed enable the system to:
   obtain a first MAC block from a first level of MAC blocks stored in a MAC data structure of the system memory;
   obtain a second MAC block from a second level of MAC blocks stored in the MAC data structure;
   replace one of a plurality of MACs stored in the second MAC block with the encrypted MAC, to update the second MAC block; and
   encrypt the updated second MAC block according to a data dependent encryption mode.

9. The at least one non-transitory computer readable medium of claim 8, further comprising instructions that when executed enable the system to:
   generate an updated MAC value based on the encrypted updated second MAC block;

encrypt the updated MAC value;
replace one of a plurality of MAC values stored in the first MAC block with the encrypted updated MAC value to obtain an updated first MAC block;
re-key the updated first MAC block with the second key; and
store the encrypted updated first MAC block in the system memory.

10. The at least one non-transitory computer readable medium of claim 1, further comprising instructions that when executed enable the system to:
allow one or more read operations to be performed ahead of at least some of the plurality of re-key operations; and
prevent one or more write operations from being performed ahead of the plurality of re-key operations.

11. A processor comprising:
at least one core to execute instructions;
a cache memory coupled to the at least one core to store data; and
a tracker cache memory coupled to the at least one core, the tracker cache memory including a plurality of entries each to store an integrity value associated with a data block to be written to a system memory coupled to the processor, wherein the integrity value is to be stored in the tracker cache memory at least until an integrity value block stored in the system memory and associated with the integrity value has been re-keyed.

12. The processor of claim 11, wherein the processor further comprises a memory protection logic to encrypt the data block before the encrypted data block is written to the system memory.

13. The processor of claim 12, wherein the memory protection logic is to evict the integrity value from the tracker cache memory after the encrypted data block is written to the system memory.

14. The processor of claim 12, wherein the memory protection logic is to configure the system memory to store an integrity value data structure including a first level to store a first plurality of integrity value blocks and a second level to store a second plurality of integrity value blocks, wherein each of the first plurality of integrity value blocks includes a first plurality of integrity values, each an integrity value for one of the second plurality of integrity value blocks, and each of the second plurality of integrity value blocks includes a second plurality of integrity values each an integrity value for a data block stored in the system memory.

15. The processor of claim 14, wherein one of the first plurality of integrity value blocks comprises a plurality of message authentication code (MAC) values each associated with one of the second plurality of integrity value blocks and a plurality of counters each associated with one or more of the plurality of MAC values.

16. The processor of claim 15, wherein the memory protection logic is to update one of the plurality of counter values when an update occurs to a data block covered by a particular one of the one or more of the plurality of MAC values.

17. The processor of claim 14, wherein the memory protection logic is to allocate write data to a first region of the system memory and to allocate read data to a second region of the system memory, and to perform re-keying of the first region of the system memory and not perform re-keying of the second region of the system memory.

18. The processor of claim 11, wherein the integrity value associated with the data block comprises a counter value.

19. A system comprising:
a processor having at least one core to execute instructions, a tracker cache memory coupled to the at least one core, the tracker cache memory including a plurality of entries each to store an integrity value associated with a data block to be written to a system memory, wherein the integrity value is to be stored in the tracker cache memory at least until an integrity value block stored in the system memory and associated with the integrity value has been re-keyed, and a memory protection logic; and
the system memory coupled to the processor, wherein the memory protection logic is to configure the system memory to store an integrity value data structure including a first level to store a first plurality of integrity value blocks and a second level to store a second plurality of integrity value blocks, wherein each of the first plurality of integrity value blocks includes a first plurality of integrity values, each an integrity value for one of the second plurality of integrity value blocks, and each of the second plurality of integrity value blocks includes a second plurality of integrity values each an integrity value for a data block stored in the system memory.

20. The system of claim 19, wherein the memory protection logic is to perform a plurality of re-key operations, each on one of the first plurality of integrity blocks stored in the system memory, to re-key one of the first plurality of integrity blocks from association with a first key to association with a second key.

21. The system of claim 20, wherein the memory protection logic is to allow one or more read operations to be performed ahead of at least some of the plurality of re-key operations, and prevent one or more write operations from being performed ahead of the plurality of re-key operations.

* * * * *